Patented Feb. 25, 1941

2,232,926

UNITED STATES PATENT OFFICE 2,232,926

PREPARATION OF MIXED CELLULOSE ETHERS

Floyd C. Peterson and Arthur J. Barry, Midland, Mich., assignors to The Dow Chemical Company, Midland, Mich., a corporation of Michigan No Drawing. Application January 28, 1939, Serial No. 253,444

1 Claim. (Cl. 260—231)

This invention relates to a process for the preparation of mixed ethers of cellulose and especially to such a process carried out in a medium comprising anhydrous liquid ammonia.

In a co-pending application Serial No. 187,655, filed January 29, 1938 now U. S. Patent No. 2,157,083, issued May 2, 1939, of which the present application is a continuation-in-part, there is disclosed a new method for the preparation of cellulose ethers. The said new method comprises reacting substantially anhydrous cellulose with an alkali metal in a medium comprising anhydrous liquid ammonia and in the presence of a liquid hydrocarbon, such as toluene, which is inert to the cellulose and liquid ammonia and substantially inert to the action of alkali metal, thereby to produce an alkali cellulosate. The said cellulosate is then reacted in a liquid ammonia medium with an etherifying agent, such, for example, as an alkyl or aralkyl halide or sulphate. In the said co-pending application Serial No. 187,655, there is described a method of making mixed cellulose ethers by reacting an alkali cellulosate with one etherifying agent, separating the so-formed ether product, reacting the said product with further quantities of alkali metal in liquid ammonia medium to produce an alkali metal salt of a cellulose ether, and then reacting the said salt with a second etherifying agent to produce a mixed ether product. While such a two-step etherification will produce mixed cellulose ethers, we have found a more convenient method whereby such ethers may be produced in a single etherification step, employing a mixture of etherifying agents.

According to the invention, substantially anhydrous cellulose is suspended in anhydrous liquid ammonia and converted to an alkali cellulosate suitably by the method of the aforesaid co-pending application Serial No. 187,655. Another method whereby alkali metal cellulosate may be prepared is disclosed in our co-pending application Serial No. 187,654, filed January 29, 1938 now U. S. Patent No. 2,145,273, issued January 31, 1939. The latter method differs from the former in that it employs an alkali amide rather than free alkali metal to react upon the cellulose. Regardless of the manner in which the alkali cellulosate is prepared, it is not isolated from the reaction mixture nor is it entirely freed from ammonia. While still containing at least enough ammonia to completely "moisten" the cellulosate, it is treated with the etherifying mixture which may comprise two or more etherifying agents of the type customarily employed in the preparation of cellulose ethers according to the older methods. Such etherifying agents include the alkyl halides such as ethyl chloride, methyl bromide, methyl iodide, ethyl bromide, n-propyl chloride, n-butyl chloride, diethyl sulphate, dimethyl sulphate, and the like, aralkyl halides such as benzyl chloride, benzyl bromide, phenyl ethyl chloride, phenyl ethyl bromide, and the like, ethylene oxide, epichlorhydrin, etc. There may be similarly employed substitution products of the etherifying agents previously named containing, for example, the nitro, nitroso, amino, or other groups substantially inert to ammonia and to the alkali metals at reaction temperature. In addition to the etherifying agents, there may also be present in the reaction vessel a liquid aromatic hydrocarbon to serve as a dispersion agent or solvent for the cellulose ether.

The amount of mixed etherifying agents employed may vary from 1 to 10, and ordinarily is about 6 equivalent weights per atom of alkali metal. After the mixture of etherifying agents has been added to the alkali cellulosate, the mixture is allowed to stand, suitably with occasional agitation, at a temperature between —80° C. and +25° C., under the corresponding vapor pressure of ammonia, until the etherification reaction is complete. This ordinarily requires from 3 to 20 hours or more (occasionally as much as 70 hours) depending upon the etherifying agents employed, the temperature of the reaction, and the number of atoms of alkali metal substituted in the cellulose molecule. We prefer to carry out the etherification reaction while the liquid ammonia is being allowed to volatilize slowly away from the reaction mixture.

Owing to the low temperature employed in the etherification reaction, side reactions between ammonia or sodium and the etherifying agents are reduced to a minimum. When the etherifying agent employed is a mixture including methyl bromide or ethyl bromide, no appreciable amounts of ethyl amine, methyl amine, ethane, or ethylene are detected in the gases escaping from the reaction mixture.

After etherification is complete and the ammonia has escaped from the reaction vessel, the mixture having in the meantime attained room temperature, the cellulose ether may be recovered according to any of several methods. One satisfactory procedure is to discharge the reaction mixture into boiling water while the mixture is still slightly alkaline, thus flashing off unreacted etherifying agents (if these materials have boiling points below that of water), as well as volatilizing any small amounts of amine which may have been formed as a by-product, and steam distilling from the mixture any hydrocarbon which may have been employed as a suspension agent or solvent throughout the reaction. Other methods of recovery of the mixed cellulose ethers will be apparent to those skilled in the art.

Various methods of carrying out our invention may be illustrated by the following examples:

Example 1

162 parts (1 mole) of substantially anhydrous cellulose and 69 parts (3 moles) of metallic sodium were allowed to react in a medium of 3200 parts of anhydrous liquid ammonia, in the presence of 500 parts of toluene which serves during this stage of the reaction as a catalyst and during the subsequent etherification as a dispersion medium. When the reaction was complete, as evidenced by the disappearance of the characteristic blue color of sodium in liquid ammonia, the ammonia was distilled until only about 200 parts of anhydrous ammonia remained in the reaction vessel. A mixture of etherifying agents consisting of 250 parts (2 moles) of benzyl chloride and 50 parts (1 mole) of methyl chloride dissolved in 1500 parts of toluene was added to the alkali cellulosate. The entire mixture was agitated for a few hours at a temperature below —33° C. When the etherification reaction was substantially complete, the remaining liquid ammonia was distilled from the mixture and the toluene suspension was poured into boiling water. The toluene was steam distilled from the mixture and the benzyl methyl cellulose was recovered as a light-colored solid. Analysis of the product showed it to contain approximately 1.5 benzyl groups per cellulose unit and approximately 1 methyl group.

Example 2

In a manner analogous to that described in the foregoing example, there was prepared 230 parts of sodium cellulose to which, suspended in 200 parts of liquid ammonia, was added a mixed etherifying agent comprising 510 parts (2 moles) of "lorol" bromide (30.6 per cent Br) and 220 parts (2 moles) of ethyl bromide, all dissolved in 1000 parts of toluene. The etherification reaction was conducted at about —35° C., with agitation, over a period of about 20 hours. The mixture was then warmed up to allow the ammonia to distill therefrom completely. The "lorol" ethyl cellulose was extracted from the crude product with petroleum ether, taken up in a solvent consisting of 67 parts of benzene and 33 parts of methanol, by volume, filtered, and the clear solution slowly mixed with a relatively large volume of hot water, whereby the solvent was flashed off and the "lorol" ethyl cellulose precipitated as a granular product. The term "lorol" is used here in the manner originally employed by Briscoe, Journal of the Society of Dyers and Colourists, 48, page 129 (1932), to define the mixture of alcohols produced from coconut oil by catalytic hydrogenation, and the mixture of alkyl halides corresponding thereto.

A variety of mixed ethers of cellulose were prepared in like manner, employing mixtures of etherifying agents of the various classes hereinbefore suggested. The method has the advantage of producing mixed cellulose ethers in a single stage etherification, in an anhydrous medium, under conditions of temperature and pressure such that all of the reacted etherifying agents enter into combination with the cellulose. Excess etherifying agent which does not react with the cellulosate, is recoverable unchanged.

Other modes of applying the principle of our invention may be employed instead of those explained, change being made as regards the method and material herein disclosed, provided the step or reactants stated by any of the following claims, or the equivalent of such stated step or reactants, be employed.

We therefore particularly point out and distinctly claim as our invention:

The single stage etherification method which comprises reacting an alkali metal cellulosate containing approximately 3 atoms of alkali metal per mole of cellulose, in a medium of liquid ammonia and in contact with toluene, with a mixture of etherifying agents consisting of about 2 moles of benzyl chloride and about 1 mole of methyl chloride, at a temperature below about —33° C., until reaction is substantially complete, thereafter removing the remaining ammonia from the reaction mixture, and recovering the so-formed benzyl methyl cellulose containing approximately 1.5 benzyl groups and approximately 1 methyl group per cellulose unit from the residual toluene medium.

FLOYD C. PETERSON.
ARTHUR J. BARRY.